United States Patent [19]

Hudalla

[11] Patent Number: 5,240,355
[45] Date of Patent: Aug. 31, 1993

[54] DENSE PHASE TRANSPORTER PNEUMATIC CONVEYING SYSTEM

[75] Inventor: Vernon R. Hudalla, Little Canada, Minn.

[73] Assignee: Nol-Tec Systems, Inc., Forest Lake, Minn.

[21] Appl. No.: 887,744

[22] Filed: May 22, 1992

[51] Int. Cl.$^5$ ............................................. B65G 53/04
[52] U.S. Cl. ....................................... 406/95; 406/93; 406/94; 406/192
[58] Field of Search ................................. 406/93-95, 406/192

[56] References Cited

U.S. PATENT DOCUMENTS

| | | | |
|---|---|---|---|
| 1,248,851 | 12/1917 | Heisler | 406/95 |
| 1,465,269 | 8/1923 | Horn et al. | 406/95 X |
| 2,739,845 | 3/1956 | Berg | 302/29 |
| 3,265,324 | 8/1966 | Mach et al. | 243/6 |
| 3,295,896 | 1/1967 | Hurtig et al. | 302/26 |
| 3,305,191 | 2/1967 | Buchwald | 243/4 |
| 3,432,398 | 3/1969 | Schmidt | 406/95 X |
| 3,550,964 | 12/1970 | Spyropoulos | 302/2 |
| 3,708,207 | 1/1973 | Steele | 302/24 |
| 4,200,412 | 4/1980 | Steele | 406/22 |
| 4,715,748 | 12/1987 | Krambrock | 406/11 |
| 4,861,200 | 8/1989 | Lubbehusen et al. | 406/14 |
| 4,909,676 | 3/1990 | Heep et al. | 406/14 |
| 4,955,761 | 9/1990 | Federhen et al. | 406/12 |

FOREIGN PATENT DOCUMENTS

| | | | |
|---|---|---|---|
| 1953538 | 5/1971 | Fed. Rep. of Germany | 406/95 |
| 2219199 | 10/1973 | Fed. Rep. of Germany | 406/95 |
| 3323739 | 1/1985 | Fed. Rep. of Germany | 406/14 |
| 270725 | 11/1990 | Japan | 406/95 |
| 138056 | 10/1979 | U.S.S.R. | 406/95 |

Primary Examiner—David M. Mitchell
Assistant Examiner—James M. Kannofsky
Attorney, Agent, or Firm—Kinney & Lange

[57] ABSTRACT

A dense phase conveying system for particulate material utilizes air at high pressure and low volume to transport particulate material between a source and a receiver through a conveying line that can range in length to several hundred feet. A series of air assists are provided to reduce the tendency of the material to build up in locations and form large slugs that cause high energy impacts on the interior of the conveying tube at corners or at the bin receiver. The air assists are positioned to provide a flow of air under regulated pressure and which use plant line pressure for a source. The air assists are intentionally zoned to provide for reducing air assist pressure in two or more zones from the source to the receiver. A plurality of air assists are provided in each zone.

6 Claims, 2 Drawing Sheets

DENSE PHASE TRANSPORTER PNEUMATIC CONVEYING SYSTEM

BACKGROUND OF THE INVENTION

The present invention relates to controllable and improved air assists for insuring uniform conveying of particulate material in a dense phase bulk material handling system.

Pneumatic transportation of materials has been shown to be an efficient way of transporting bulk particulate materials within plants using such materials. The transporting of these particular, that is granular or powdered material is generally done in two types of pneumatic conveying. The first is a "dilute" phase pneumatic conveying system that utilizes low air pressure, generally 15 psi and below with a high air volume relative to the volume of the material being conveyed. A fan or a low pressure blower is used for introducing air into the conveying line. A "dense" phase bulk material transport system has a much higher ratio of material to air and utilizes higher pressure air, generally from about 15 to 70 psi and above. Pressure ranges are commonly up into the 50–60 psi range in dense phase transporters of the type shown herein.

U.S. Pat. No. 4,955,761 to Fedderhorn et al. illustrates a dense phase pneumatic conveying system which introduces a gas under pressure into the transporting conduit in a direction that is generally transversely in the direction of conveying movement, but the system relies on forming plugs in the conduit which are separated from each other by cushions of air. This patent relates to removing plugs at bends of conduits, while the present invention is directed toward maintaining a relatively uniform flow to avoid plugs or slugs from causing high energy impact at bends of conveying conduits.

U.S. Pat. No. 3,295,896 illustrates a pneumatic transportation system for bulk material that is pulverant, powdery, granular or fragmented. This involves a series of compartmented sections in a transporter system, and not a continuous flow system. The batches of material are conveyed by compressed air, and the pressures that are used for conveying in each compartment are successively lower from the source to the receiving bin. Fluidizing cells are used in each compartment to feed the conveying air into the compartment in a lateral direction. Pressure transducers are utilized for determining the regulated pressure in the next subsequent compartment on the conveying conduit. The pressure transducers are used for controlling the valves at the inlet to each compartment as well.

U.S. Pat. No. 2,739,845 shows a granular material conveyor which utilizes a tapered conduit, but utilizes air injection manifolds to inject air in response to differential pressure controllers. Pressure gradients within the conduit or line are used for control, and if the pressure decreases additional quantities of supplemental conveyance fluid are injected.

U.S. Pat. Nos. 4,861,200, and 4,909,676 show the ability to add air to aid in dislodging clogged areas, but these devices operate on differential pressure switches.

U.S. Pat. No. 4,955,761 is a dense flow conveying device, and a valve is operated to inject air into the conduit when pressure increases in a section of the conduit.

U.S. Pat. No. 4,715,748 is a bulk conveying system that also uses air inlet valves that are pressure sensitive to blockages downstream so that if air pressure rises upstream of a blockage it actuates a diaphragm that opens the valve and permits air under pressure to be provided.

A pneumatic conveyor tube booster valve is shown in U.S. Pat. No. 3,708,207.

None of the patents show the provision of zoned air assists that are pressure regulated in decreasing pressure in a continuous conveying line from the source to the receiver utilizing plant line pressure for the air inputs.

SUMMARY OF THE INVENTION

The present invention relates to a dense phase transporter system for transporting particulate material, that is, granular or powdered material, in a conveying line utilizing low volume, high pressure air introduced at a source or transporter, and used for moving the material through the conduit to a receiving bin. The conveying line is provided with a plurality of longitudinally spaced air assist nozzles, or air assists each of which is connected to a plant air supply through a pilot valve adjusted regulator. The air assists are controlled in zones, so that a series of the air assists will inject air at a first high pressure adjacent to the transporter, and a second zone of air assists have a reduced pressure and are located in direction toward the receiving bin from the first zone. Several zones can be used, depending on the length of the conveying line and the number of turns, but the arrangement is such that the graduated reduction of air pressure for the air assists in succeeding zones of the conveying line is provided for efficient operation and insuring that large slugs do not form.

Each air assist is connected to plant air through a pilot regulator to provide easy control of outlet pressure directly from a plant air supply. The pilot pressure controlling the regulator is reduced in the zones where a lower pressure is desired for the air assists. Because the plant air line that is connected to the air assists is at a higher pressure than the conveying line, there will be no backfeeding into the air supply manifold, which may occur with other booster type systems. The air assists also provide for precise controlled material to air ratios, to maintain minimum conveying velocities and optimum conditions for minimizing component wear and product degradation.

DETAILED DESCRIPTION OF THE PREFERRED EMBODIMENTS

Figure 1:
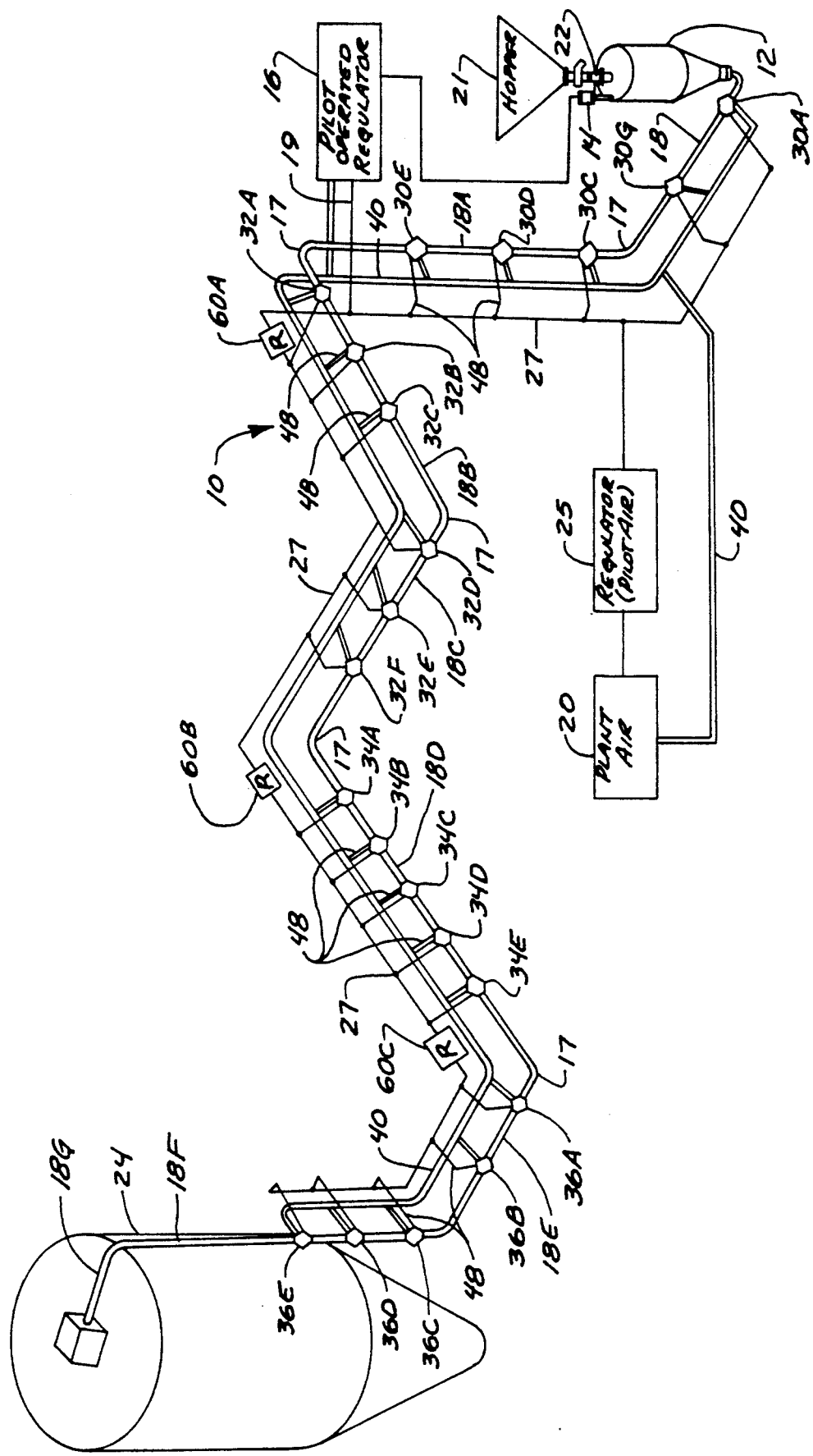
FIG. 1 is a schematic layout of a typical dense phase pneumatic conveying system, utilizing air assists assemblies made according to the present invention.

A dense phase pneumatic conveying system indicated generally at 10 includes a transporter 12 of a known design, that has an input air connection 14 which receives air from a pilot operated regulator value 16 of suitable design, as will be more fully explained, for causing material in the transporter 12 to be extruded and moved into a conveying line illustrated generally at 18. The pilot operated regulator 16 receives plant air from a line 40 connected to a plant air source 20, and provides output air to the transporter at a regulated pressure dependent upon the pressure at the pilot pressure input, which is connected to a pilot pressure line 19. The pilot air line is regulated at a desired pressure using a pressure regulator 25 that is connected to the plant air source 20 and regulates the pilot pressure at a desired level. Line 19 is connected to a pilot air line 27 leading from regulator 25 has line 19 connected to it. The pilot operated regulator 16 supplies an adequate volume of air to the transporter 12. The transporter also has a hopper 21 for holding product and a product input valve arrangement 22, also of conventional design, for introducing the particulate material to be conveyed in the conveying line 18. The conveying line 18 is generally a tube, in the range of 1 to 12 inches in diameter, and leads from the transporter to a receiver bin 24, which is used to hold the product for later discharge or use in a plant process, for example. The conveying line is illustrated as being small in diameter relative to air lines, but in practice is larger in proportion than the illustration in FIG. 1.

The conveying line 18 has a series of straight sections joined by bends 17. For example, conveying line section 18A may be a vertical section leading from a horizontal section adjacent to the transporter. Conveying line sections 18B, 18C, 18D and 18E may be horizontal sections. A final vertical section 18F may be used before a final discharge section 18G passes into the receiving bin 24.

The bends 17 in the conveying line are generally right angle bends, and in dense phase conveying, materials may tend to settle toward one side of a conduit or tube forming the conveying line, or build up into "slugs" at certain locations of the conduit or tube 18. A "sand dune" effect is observed. As the particles build up into a slug, the slug will eventually be moved by the air and will form a quite large mass of moving material that tends to be slammed up against the next downstream bend in the conveying line. This causes a substantial shock load on the conduit forming the conveying line, as well as abrasion of the interior of the conduit or tube.

In order to assist in maintaining uniform product flow, and preventing build up of very large, high mass slugs of material in the continuous flow conduit 18, a plurality of air assist assemblies are placed at locations spaced along the conveying line. Such air assists are indicated at 30A–30E in a first zone, 32A–32F in a second zone, 34A–34E in third zone, and 36A–36E in a fourth zone.

Each of the air assist assemblies is designed to inject air from a plant air line 40 connected to plant air source 20 such as the air assist assemblies each at a regulated pressure, utilizing a pilot operated regulator that has a pilot pressure input and which regulates the output to provide air to the conveying line at a regulated pressure.

Pilot pressure line 27 also provides the pilot pressure from regulator 25 to each of the air assist assemblies.

Figure 2:
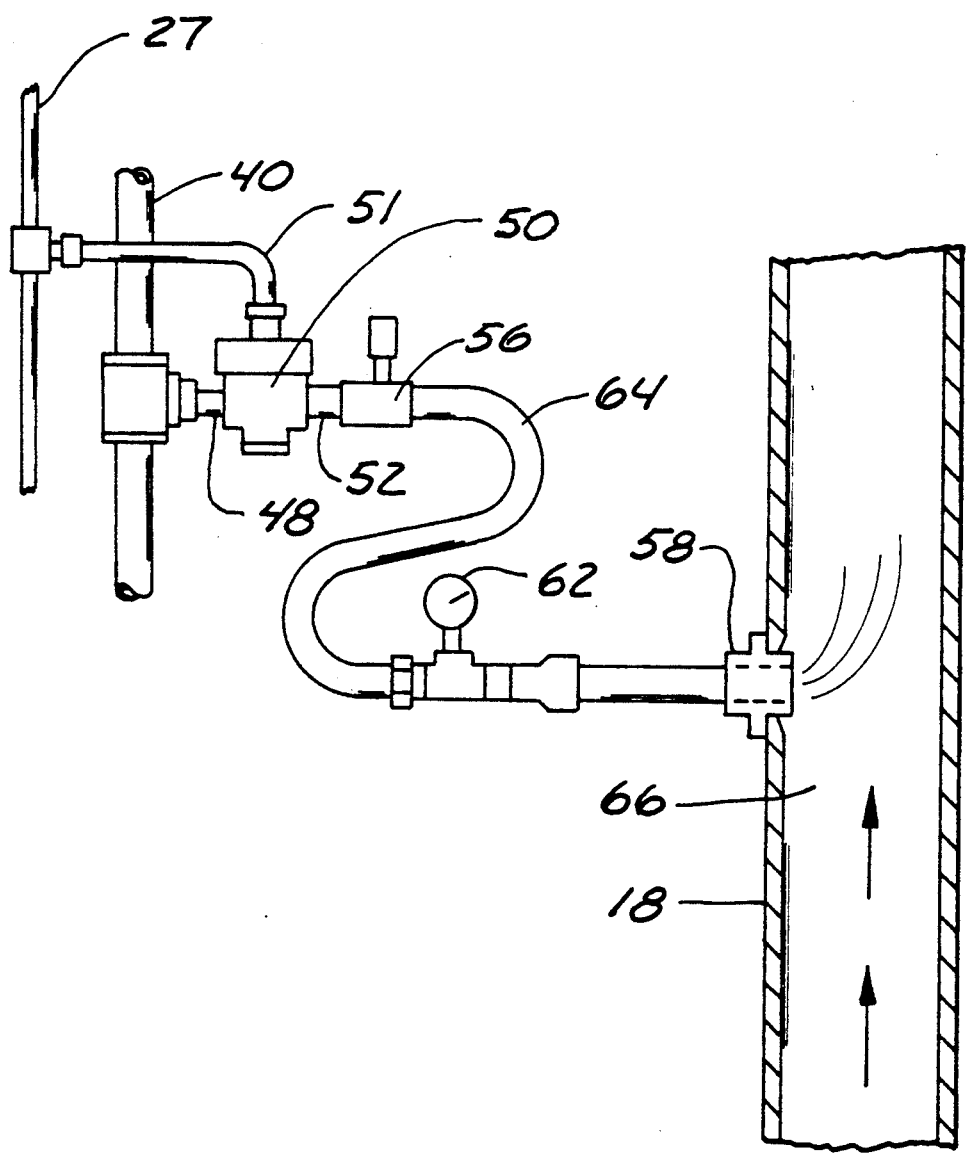
FIG. 2 is an enlarged view of a typical air assist assembly shown in a conveying line with the regulator illustrated.

Each of the air assist assemblies is constructed as shown in FIG. 2. The conveying line 18 is illustrated as a tube, and each individual air assist assembly previously indicated in the conveying line is constructed identically.

The plant air pressure line 40 coming from plant source 20 is at high pressure (for example, 80–100 psi) and is connected through a suitable connector line 48 to a pilot pressure adjusted regulator value 50, which has air outlet 52 providing a regulated air pressure to a needle valve 56. Needle valve 56 may be adjusted for individual flow control. An air nozzle 58 is fixed in place in an opening through the wall of conveying line 18. The axis of the air nozzle is perpendicular to the axis of conveying line 18 and provides a regulated pressure air flow transversely to the conveying line. The same pressure is provided at each of the nozzles in each of the respective zones 30A–30E; 32A–32F; 34A–34E; and 36A–36E. The first zone of air assists 30A–30E is controlled by the same pilot pressure level as the regulator 16. The nozzles in each zone operate at the same pressure and each subsequent downstream zone is at a decreased pressure.

A suitable pressure gauge 62 can be provided on each of the nozzle supports, and the nozzles 58 can be connected to their respective needle valves with lines 64.

The pilot pressure line 27 on the output of regulator 25 is connected to a pilot pressure or control port on the pilot pressure valve 50 with a line 51 and suitable fittings.

The pilot regulator valves 50 and 16 are of a known type which regulate the output pressure as a function of the pilot pressure. Pilot-operated valves sold by Watts Company of Kitterby, Maine have been found acceptable, but other manufacturers will sell equivalent valves.

The nozzles 58 will discharge a flow of air that intercepts the conveying line flow generally as indicated by the shading lines 66, on the interior of the conveying line or tube 18. The flow from nozzles 58 is through a large enough diameter pipe so the flow pattern will be at a velocity such that it does not abrade the other side of the conveying line. Small amounts of material may build in the conveying line, but the reduced pressure air introduced in each zone reduces the size and density of the slugs. High mass slugs that will ram against the corner bends 17, or into the bin receiver at the end of the line and cause high impact loads on the system are greatly reduced.

The pressures in the individual zones are established by having zone pilot pressure regulators 60A, 60B and 60C provided in series in pilot pressure line 27. Each series pilot pressure regulator 60A, 60B and 60C can be adjusted to reduce the pilot pressure that is set by pressure regulator 25, and thus, the regulated pressure from the pilot valves, in each subsequent air assist zone in downstream direction. The ability to reduce the pressure of air introduced into the conveying line from each of the pilot valves in its particular zone from the transporter to the receiver provides efficient flow and operation. Adjustment of very few regulators is all that is needed to change the pressure at the air assists when zones are used. Also, the downstream pilot pressure can never go higher than the main regulator 25, so exceedingly high pressure inputs in case of failure of regulators 60A–60C are avoided.

If the pilot air pressures in line 27 is set so that a 50 psi pressure is provided from the output of pilot regulator 16 for the transporters, the air assists 30A–30E would provide 50 psi to the line 18. Regulator 60A may be regulated so the pilot regulators provide 40 psi air to conveying line 18 from air assists 32A–32F; regulator 60B may be regulated to provide air to conveying line 18 from air assists 34A–34E at 20 psi and regulator 60C may be regulated to provide air from air assists 36A–36E to line 18 to provide air to the conveying line 18 at 15 psi, depending on the conditions, the materials, and volumes.

By having a plurality of individual air assists all at the same pressure in a zone, in a continuous flow conveying line, as opposed to a conveying line that has compartments or conveying zones at different pressures, the benefits of reduced volumes of conveying air, reduced maintenance due to damage caused by "slugging" and more efficient transfer of materials is achieved.

The air assists can be spaced as desired. Usually the spacing is less adjacent the transporter and can be greater near the receiver where lower pressure is present in the conveying line. There is one assist placed very close to each bend 17 on the downstream side, preferably within five feet, to insure material is assisted after it has gone around a bend.

In a process of handling materials, the use of a continuous flow conduit for pneumatic conveying and having spaced pluralities of air assist nozzles for injecting laterally directed air at reduced pressures for each of the zones between the transporter and receiver is the desired process.

The plant air source shown schematically can be different compressors for different zones if desired. In particular, if the receiver bin 24 is in a separate building the last zone may be connected to a plant air compressor in that building.

Although the present invention has been described with reference to preferred embodiments, workers skilled in the art will recognize that changes may be made in form and detail without departing from the spirit and scope of the invention.

What is claimed is:

1. A pneumatic transport system for bulk material utilizing dense phase conveying techniques for conveying material in a pneumatic conveying line, said system comprising:
   a conveying line;
   a transporter at an inlet end of the conveying line for moving material to be conveyed into the conveying line;
   a receiver at an outlet end of the conveying line, with the conveying line being a continuous conveying line between the transporter and receiver;
   a plurality of air assists at spaced intervals along the conveying line, said air assists being divided up into at least two groups, each group forming a zone along a length of the conveying line, said air assists having nozzle means for directing air laterally into the conveying line; and
   a separate pilot pressure controlled pressure regulator for each nozzle means directly connected to a high pressure source independently of other pressure regulators for regulating the pressure of air through each respective nozzle means in each of the zones, said system further comprising means for regulating pilot air pressure provided to control the output of each pilot operated pressure regulator in each zone such that the air pressure is reduced from one zone to the next zone in direction toward the receiver.

2. The system as specified in claim 1 wherein there is a plurality of more than two zones, and at least one of the zones comprises means for controlling flow across a bend in the conveying line.

3. The system as specified in claim 1 wherein the zones decrease in air pressure from one zone to the next zone by a preset amount between the transporter and the receiver.

4. The system of claim 3 and a pilot pressure line from a regulator pilot pressure source connected to the pilot operated regulators, the pilot pressure line comprising means for controlling the pilot pressure regulators in each zone.

5. The system of claim 4 wherein each of the pilot pressure controlled regulators has an outlet line connected to a respective nozzle of said nozzle means with a separate manually adjustable needle valve to control the air flow at each of the pilot pressure controlled pressure regulators.

6. A process for pneumatic transport of bulk material in a conveying line utilizing dense phase pneumatic flow comprising the steps of:
   introducing material to be conveyed into the conveying line under air pressure;
   providing the conveying line as a continuous conveying line for conveying material to a receiver;
   providing a plurality of air assists at intervals along the conduit to inject air laterally across the conveying line;
   zoning the air assists independently of the pressure in the conveying line through pilot pressure operated pressure regulators, said zoning including connecting each independently regulator to a high pressure source and to respective one of the air assists and decreasing the air assist pressure from one zone to the next zone sequentially toward the receiver.

* * * * *